(12) United States Patent
Katsuragi et al.

(10) Patent No.: US 6,970,973 B2
(45) Date of Patent: Nov. 29, 2005

(54) DISK ARRAY SYSTEM HAVING AN EXTENDED LOAD BALANCING FUNCTION

(75) Inventors: Eiju Katsuragi, Odawara (JP); Mikio Fukuoka, Matsuda (JP); Takao Sato, Odawara (JP)

(73) Assignee: Hitachi, Ltd., Tokyo (JP)

( * ) Notice: Subject to any disclaimer, the term of this patent is extended or adjusted under 35 U.S.C. 154(b) by 326 days.

(21) Appl. No.: 10/368,405

(22) Filed: Feb. 20, 2003

(65) Prior Publication Data

US 2003/0177310 A1    Sep. 18, 2003

(30) Foreign Application Priority Data

Mar. 18, 2002  (JP) .............................. 2002-074847

(51) Int. Cl.⁷ ............................................. G06F 12/00
(52) U.S. Cl. ...................... 711/114; 711/112; 711/154; 718/105
(58) Field of Search ....................... 711/111, 112, 114, 711/154, 170, 717; 718/105; 714/5, 6, 52

(56) References Cited

U.S. PATENT DOCUMENTS

| | | | |
|---|---|---|---|
| 5,592,612 A | 1/1997 | Birk | |
| 5,905,995 A * | 5/1999 | Tabuchi et al. | 711/114 |
| 6,145,028 A | 11/2000 | Shank et al. | |
| 6,266,740 B1 | 7/2001 | Don et al. | |
| 6,405,284 B1 | 6/2002 | Bridge | |
| 6,446,162 B1 * | 9/2002 | Korst et al. | 711/114 |
| 6,526,478 B1 * | 2/2003 | Kirby | 711/114 |
| 6,553,387 B1 | 4/2003 | Cabrera et al. | |
| 6,708,265 B1 | 3/2004 | Black | |
| 6,711,649 B1 * | 3/2004 | Bachmat et al. | 711/114 |
| 6,728,831 B1 | 4/2004 | Bridge | |
| 6,766,416 B2 * | 7/2004 | Bachmat | 711/114 |
| 2002/0138559 A1 | 9/2002 | Ulrich et al. | |

* cited by examiner

Primary Examiner—Brian R. Peugh
(74) Attorney, Agent, or Firm—Mattingly, Stanger, Malur & Brundidge, P.C.

(57) ABSTRACT

A disk array system including plural magnetic disk drive groups each constructed by plural magnetic disk drives and a disk controller for controlling data transfer between the plural magnetic disk drive groups and an upper unit. The disk controller obtains a use frequency (I/O load) with respect to each magnetic disk drive group and selects a combination of the magnetic disk drive groups on the basis of the use frequency. Logic volumes from the upper unit and allocated in each magnetic disk drive group before the combination are reallocated among the combined magnetic disk drive groups, thereby concatenating the magnetic disk drive groups.

12 Claims, 7 Drawing Sheets

FIG. 4

PARAMETER TABLE 150

| START TIME |
| --- |
| THE NUMBER OF TARGET ECC GROUPS |
| THE NUMBER OF CONCATENATIONS |
| SAMPLING PERIOD |
| SAMPLING TIME |

FIG. 5

MONITOR DATA TABLE 160

| ECC NO. | ELAPSED TIME | | | | | ... | AVERAGE VALUE |
| --- | --- | --- | --- | --- | --- | --- | --- |
| | +0 SEC. | +10 SEC. | +20 SEC. | +30 SEC. | +40 SEC. | | |
| 1 | | | | | | | |
| 2 | | | | | | | |
| 3 | | | | | | | |

FIG. 6

CONCATENATION INSTRUCTION TABLE 170

| NO. | CONCATENATION TARGET ECC NO. 1 | CONCATENATION TARGET ECC NO. 2 |
| --- | --- | --- |
| 1 | | |
| 2 | | |

DISK ARRAY SYSTEM HAVING AN EXTENDED LOAD BALANCING FUNCTION

BACKGROUND OF THE INVENTION

This invention relates to a disk array system as one of memory devices which are used in a computer system and, more particularly, to a disk array system for monitoring access frequency to each disk drive and reallocating logical volumes in accordance with loads on the disk drives.

A disk array technique is used to improve the reliability of a memory device. Such a technique is a method proposed by David A. Patterson et al., "Report No. UCB/CSD87/391" of University of California, December, 1987. According to the method, a plurality of disk drives are grouped (hereinafter, referred to as an ECC group) and redundancy is added thereto, thereby enabling a failure to be recovered when the failure of the disk drive occurs.

According to Patterson et al., the disk arrays are classified into the following six levels in dependence on a level of reliability. At RAID level 0, data is balance-allocated to a plurality of disk drives and redundant data to recover failure data is not provided. RAID level 1 is also called a mirror ring, a perfect duplicative disk drive of one disk drive is provided, and when a failure occurs in the disk drive, processes can be executed by the duplicative disk drive. At RAID level 2, a Hamming code is used as redundant data and the redundant data and user data are interleaved to a plurality of disks.

At RAID level 3, the user data is divided on a bit or byte unit basis and the divided data is written into or read out from a plurality of disk drives in parallel. The disk drive to record the redundant data is fixedly allocated. The rotation of each disk drive is synchronized and the reading/writing operations from/into the drives are executed in parallel. At RAID level 4, the data is divided on a block unit basis and the reading/writing operations are executed to the ECC group. The disk drive to record the redundant data is fixedly allocated in a manner similar to that at RAID level 3. Unlike RAID level 3, the rotation of the disk drives is not synchronized. At RAID level 5, the data is divided on a block unit basis and the reading/writing operations are executed to the ECC group in a manner similar to that at RAID level 4. RAID level 5 differs from RAID level 4 in a respect such that the disk drive to record the redundant data is not fixedly allocated but the redundant data is recorded to all of the disk drives.

Among RAID level 0 to RAID level 5, RAID level 1 and RAID level 5 are generally used. At RAID level 5, assuming that the number of disk drives to store the data is equal to n, the data is stored into the (n+1) disk drives. Generally, when the value n becomes large, the number of disk drives increases, so that performance is improved. However, since a possibility that a failure occurs in the disk drive in the ECC group and the ECC group becomes unusable also rises, if the value n is large, the reliability of the disk array system deteriorates.

SUMMARY OF THE INVENTION

A problem to be solved by the invention is to improve performance of an ECC group without lowering reliability of a disk array system. That is, in the case of RAID level 5, although the performance can be improved by increasing the number (n) of disk drives for storing data, the reliability deteriorates contrarily.

As a measure for solving the problem, according to the method disclosed in JP-A-06-161837, two ECC groups at RAID level 5 are concatenated and data is alternately allocated to the two ECC groups. In the case of such a method, since a ratio of the number of disk drives for storing the data to the number of disk drives for storing redundant data is not changed, the performance is also improved and the reliability does not deteriorate.

However, there is a case where the performance is deteriorated in dependence on a combination of the ECC groups which are concatenated. For example, even if capacities of the ECC groups are the same and the numbers of logic devices belonging to the ECC groups are the same, since an I/O load on each ECC group depends on a using method of an upper apparatus, if the ECC groups of heavy I/O loads are combined, there is a possibility of deterioration of the performance. In dependence on a form of work, there is also a case where even in the ECC group in which an I/O load is stationarily low, if an I/O is received all day, that is, for 24 hours, the load becomes temporarily heavy at certain specific time, and if the ECC groups in which time zones during which the load becomes temporarily heavy are the same are combined, there is a possibility of lowering the performance.

It is an object of the invention to provide a disk array system in which by monitoring use frequency (I/O load) of each ECC group and concatenating two or more proper ECC groups, performance can be improved without lowering reliability of the ECC groups.

To accomplish the above object, according to one aspect of the invention, there is provided a disk array system having: a plurality of magnetic disk drive groups each comprising a plurality of magnetic disk drives; and a disk control apparatus for controlling data transfer between the plurality of magnetic disk drive groups and an upper apparatus such as a host computer, wherein the disk control apparatus obtains use frequency with respect to each of the plurality of magnetic disk drive groups and selects a combination of the magnetic disk drive groups on the basis of the obtained use frequency, and logical volumes allocated in each of the magnetic disk drive groups before the combination are reallocated among the combined magnetic disk drive groups, thereby concatenating the magnetic disk drive groups.

Other objects, features and advantages of the invention will become apparent from the following description of the embodiments of the invention taken in conjunction with the accompanying drawings.

BRIEF DESCRIPTION OF THE DRAWINGS

FIG. 4 is a table for storing parameters at the time of reallocating logical volumes allocated in a drive group;

FIG. 5 is a table for storing monitor data of each ECC group before concatenation;

FIG. 6 is a table showing ECC groups as targets of concatenation;

DETAILED DESCRIPTION OF THE EMBODIMENTS

Figure 1:
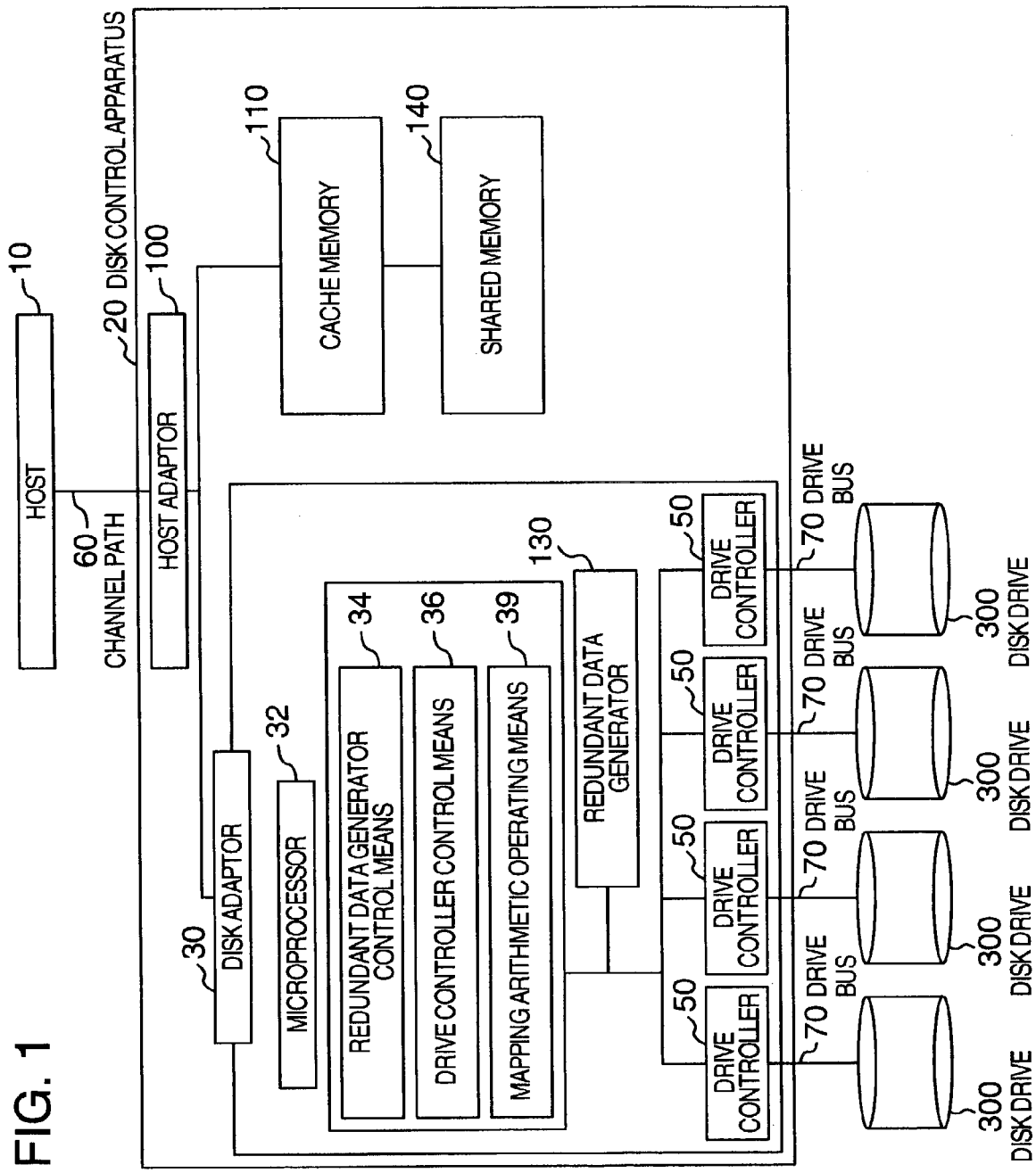
FIG. 1 is a schematic diagram of an information processing system regarding a disk array system according to an embodiment of the invention.

A disk array system according to the first embodiment of the invention will be described in detail hereinbelow with reference to FIGS. 1 to 9B. FIG. 1 is a schematic diagram of an information processing system regarding the disk array system according to the first embodiment of the invention. A central processing unit (HOST) 10 and a disk control apparatus 20 in FIG. 1 are connected by a channel path 60. The disk control apparatus 20 includes a host adaptor 100, a disk adaptor 30, a cache memory 110, and a shared memory 140. The host adaptor 100 has one or more microprocessors and functions as an interface with the HOST. The disk adaptor 30 executes reading/writing operations from/into drives. The cache memory 110 is a memory for temporarily storing read/write data which is generated by a request from the HOST. The shared memory 140 is a memory which can be referred to by all of the microprocessors.

The disk adaptor 30 has one or more microprocessors 32, a redundant data generator 130, and drive controllers 50. A program for the microprocessors 32 has: redundant data generator control means 34 for controlling the redundant data generator 130; drive controller control means 36 for executing reading/writing operations to disk drives 300 by using the drive controllers 50; and mapping arithmetic operating means 39 for calculating the drive in which requested data has been stored in response to reading/writing requests from the HOST.

Figure 2:
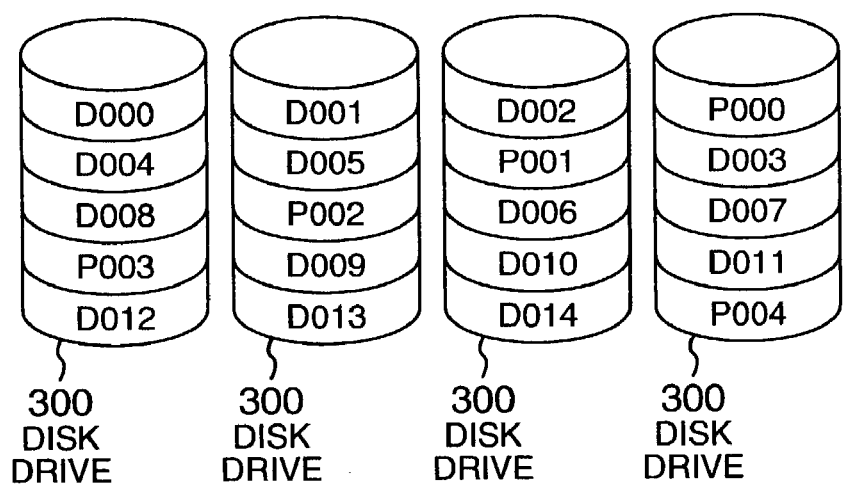
FIG. 2 is a diagram showing mapping of logic tracks of a HOST and magnetic disks.

FIG. 2 is a diagram showing mapping of logic tracks of the HOST and magnetic disks and shows allocation of input/output data from the HOST to the drives. First, in the magnetic disks, redundant data P000 is allocated on the rightmost side of the first row, and after the second and subsequent rows, redundant data P001, P002, P003, . . . are allocated in a manner such that they are allocated in a position directly left of the redundant data of the previous row and, if the storing position of the redundant data of the previous row is the leftmost, the next redundant data is allocated in the rightmost position. Logic tracks D000 to D015 of the HOST are sequentially mapped from a position directly right of the redundant data and, if the redundant data exists in the rightmost position, they are sequentially mapped from the leftmost side. As redundant data of each row, the exclusive OR of values of three logic tracks of each row is stored. When one of the logic tracks of each row fails, the failure data can be recovered by the exclusive OR of the residual data in this row and the redundant data.

Figure 3:
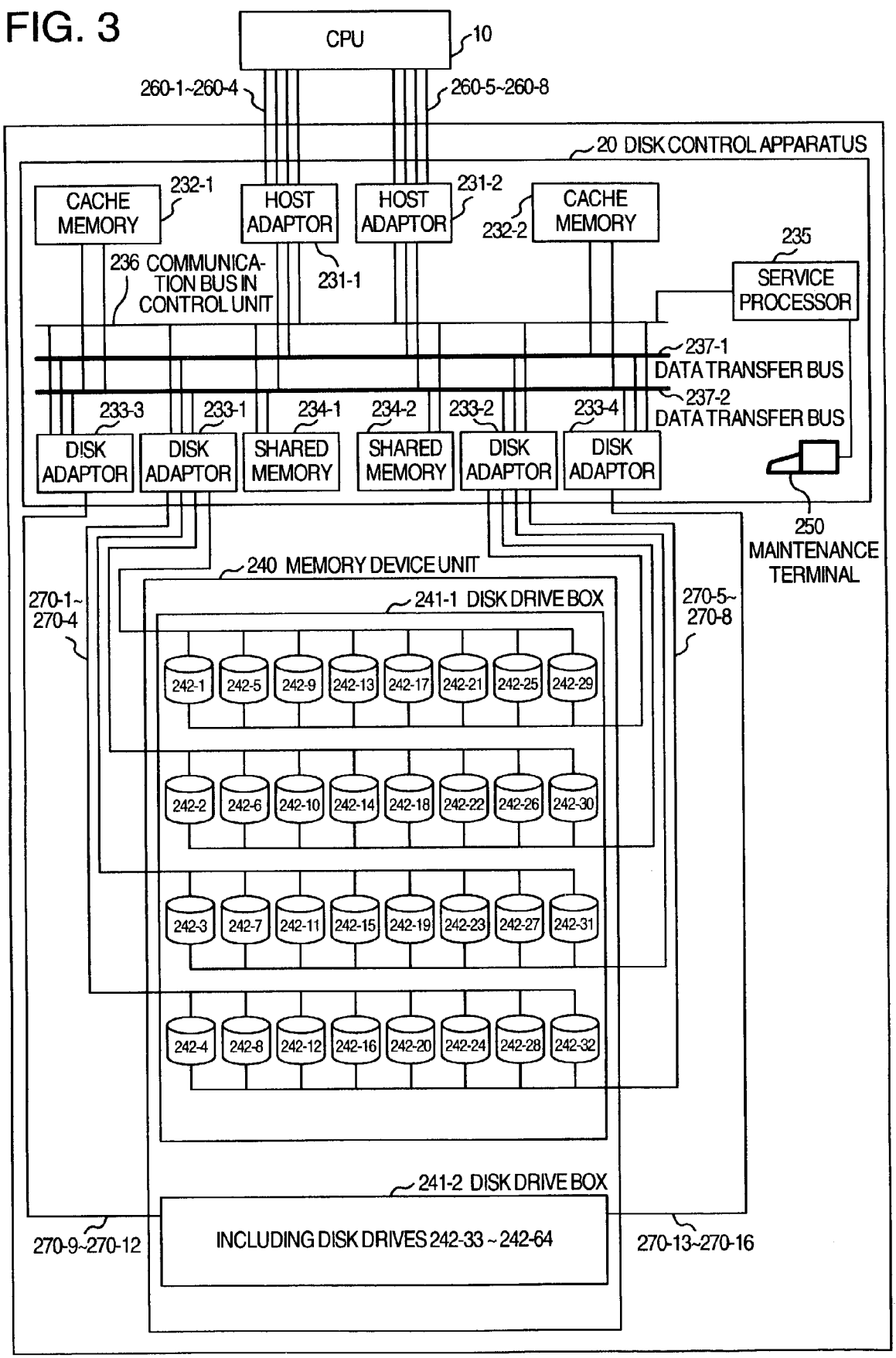
FIG. 3 is a diagram showing a whole construction of the information processing system regarding the embodiment.

FIG. 3 is a diagram showing a whole construction of the information processing system regarding the embodiment. The channel path 60 in FIG. 1 corresponds to 260-1 to 260-8, the host adaptor 100 in FIG. 1 corresponds to host adaptors 231-1 and 231-2, the disk adaptor 30 in FIG. 1 corresponds to disk adaptors 233-1 to 233-4, the cache memory 110 in FIG. 1 corresponds to cache memories 232-1 to 232-2, the shared memory 140 in FIG. 1 corresponds to shared memories 234-1 to 234-2, respectively.

Although there is one ECC group in FIG. 1, the system has a plurality of ECC groups in FIG. 3. The disk drives configuring the respective ECC groups are shown by reference numerals (242-1 to 242-4), (242-5 to 242-8), (242-9 to 242-12), (242-13 to 242-16), (242-17 to 242-20), (242-21 to 242-24), (242-25 to 242-28), and (242-29 to 242-32), respectively. A configuration similar to that mentioned above is provided with respect to a disk drive box 241-2.

In the disk control apparatus 20 having such a construction, the first embodiment of the invention is constructed as follows. First, it is necessary to set parameters showing a reference of selection from a maintenance terminal 250. FIG. 4 is a table for storing parameters at the time of reallocating the logical volumes allocated in the drive group. As shown in a parameter table 150 in FIG. 4, the parameters include: the number of target ECC groups indicative of the number of ECC groups to be concatenated; the number of concatenations showing how many ECC groups are concatenated; a sampling period (a group time unit corresponding to continuation of sampling; for example, a period of 10 seconds as shown in FIG. 5) showing at which time interval data elements are grouped when the input/output (I/O) loads on the ECC groups are monitor; sampling time (monitoring period such as 24 hours) showing a period of time of monitoring; and start time showing start time of the monitoring. The user sets the parameters by the maintenance terminal. For example, in the case where one ECC group comprising four disk drives is concatenated with another ECC group (single group) and three concatenated ECC groups are configured, the number of concatenations is equal to 2 and the number of target ECC groups is equal to 3.

The set values are stored into the parameter table 150 provided in the shared memory via a service processor 235. At this time, the current time is also set as start time into this table. Upon parameter setting, by previously having specified values as default values, there is no need to input all of the parameters. The parameters can be also set while being subjected to processes of the host I/O.

Figure 7:
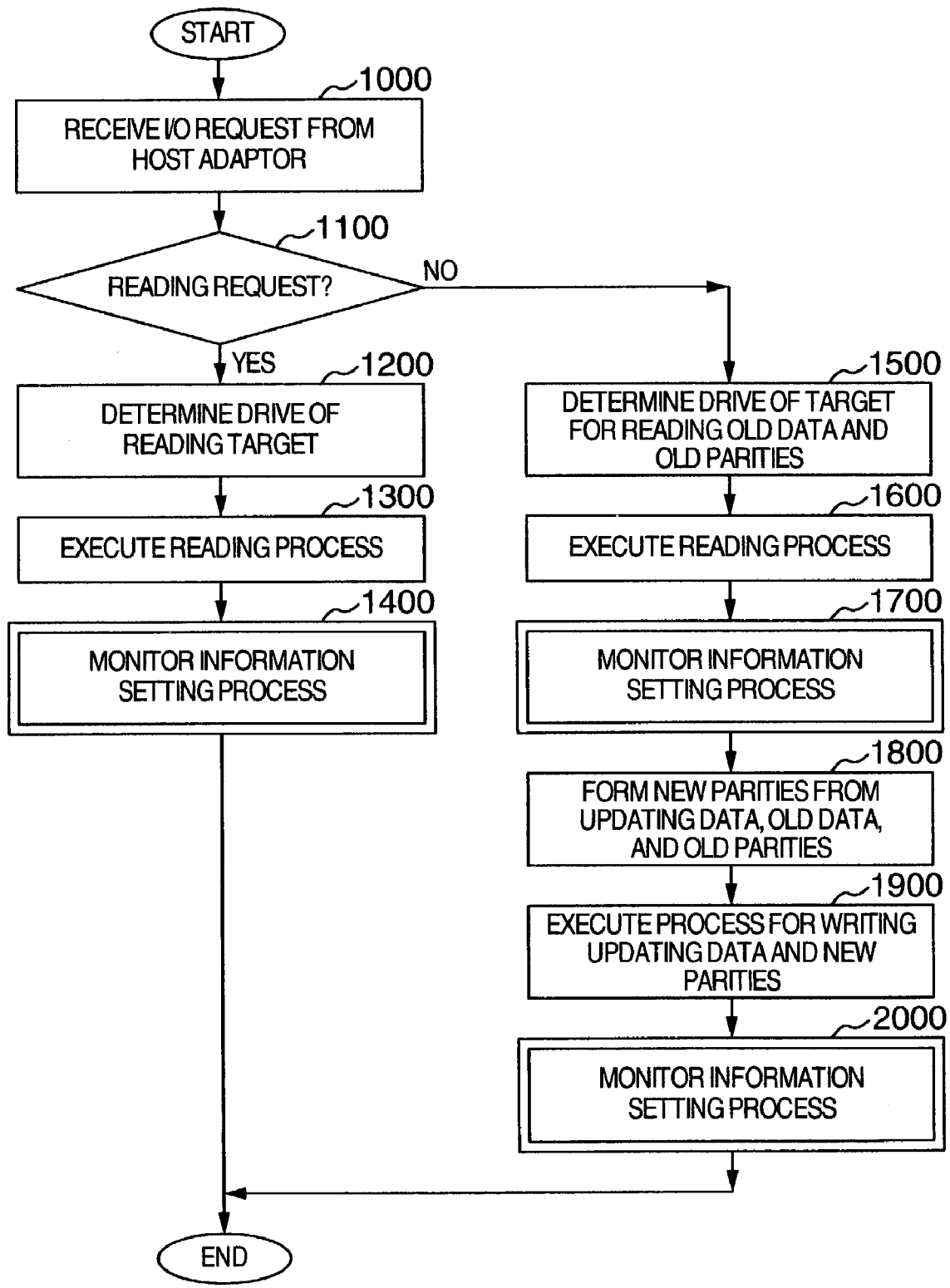
FIG. 7 is a diagram showing a flow of processes in association with reading/writing operations from the HOST.

Subsequently, processes which are executed after completion of the parameter setting will be described with reference to FIG. 7. A reading request or a writing request is issued from the HOST. In step 1000, a host request is transmitted from the host adaptor 100 to the disk adaptor. Subsequently, in step 1100, if the host request is the reading request, step 1200 follows. If it is the writing request, step 1500 follows. In the case of reading, the drive as a target to be read out is determined. For example, if the reading request is issued to D002 in FIG. 2, the second drive from the right is selected. This process is executed by the mapping arithmetic operating means 39.

Subsequently, step 1300 follows and data is read out from the selected drive and stored into the cache memory. In next step 1400, monitor information is set. The setting operation of the monitor information will be explained hereinlater.

A flow of processes which are executed in the case where the request from the HOST is the writing request will be described hereinbelow. In the case of writing, it is necessary to form parity data corresponding to updating data from the following three: that is, old data and an old parity before the updating data is written into the drive; and the updating data. First, in step 1500, the drive from which the old data and the old parity are read out is determined. This process is executed by the mapping arithmetic operating means 39. For example, in the case of writing to D002 in FIG. 2, the second drive from the right is selected in order to read out the old data and the rightmost drive is selected in order to read out the old parity. In next step 1600, the old data and the old parity are read out from the cache memory.

Subsequently, step 1700 follows and the monitor information is set. At this time, since the reading operation is executed twice (the reading of the old data and the reading of the old parity), the counting operation is executed twice. Subsequently, step 1800 follows and a new parity is formed from the updating data, the old data, and the old parity by using the redundant data generator 130 and stored into the cache memory. In next step 1900, the updating data and the new parity are written into the drive. The drive in which they are written is the same as the drive from which the old data and the old parity were read out. In next step 2000, the monitor information is stored. At this time, since the writing operation is executed twice, the counting operation is executed twice. Step 1700 can be combined to the process in step 2000.

Figure 8:
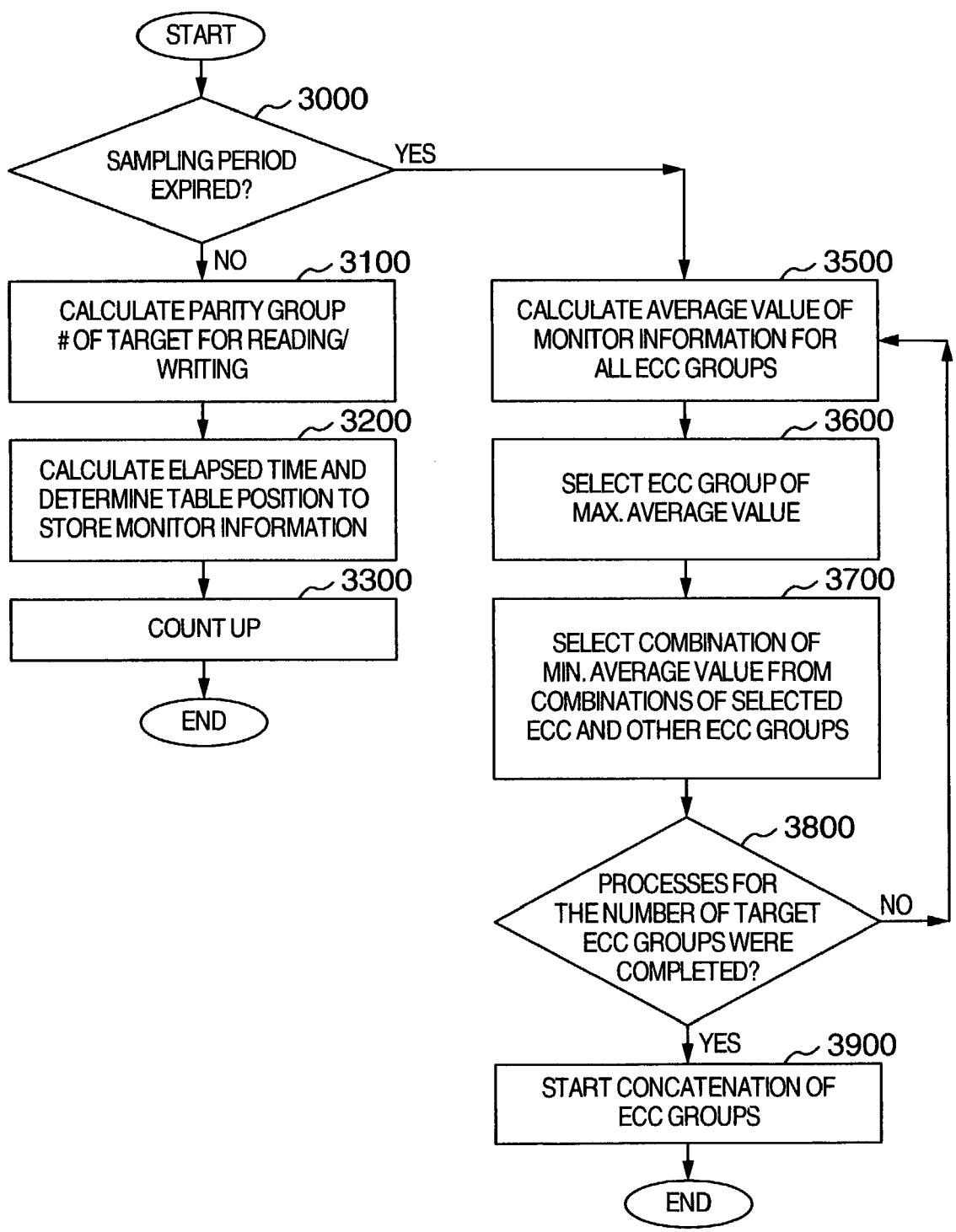
FIG. 8 is a diagram showing a flow of processes at the time of obtaining monitor information.

A setting process of monitor data will now be described with reference to FIG. 8. It is an object of this process to set I/O frequency at each time of each ECC group into a monitor table 160. It is assumed that prior to processing, each element in the monitor table 160 has been cleared to "0".

A flow for processes in FIG. 8 will be explained hereinbelow. First, in step 3000, whether the sampling period of time has expired or not is discriminated. Since the start time and the sampling time have been preset in the parameter table 150, such a discrimination is made by setting the sum of the start time and the sampling time to expiration time and checking whether the current time has exceeded the expiration time or not. If the sampling period of time does not expire yet, step 3100 follows and the number of the ECC group as a target of the reading/writing operations is obtained. The numbers starting from 1 are preliminarily and sequentially allocated to the ECC groups, thereby obtaining to which ECC group the reading/writing operations are executed.

Subsequently, step 3200 follows, the elapsed time is calculated and a position in the table where the monitor information is stored is determined. For example, if a difference between the start time of monitoring and the current time is equal to 15 seconds in the reading/writing operations to the second ECC group, the table position is set to the second column of the second row (position of +10 seconds). In next step 3300, a count value of the determined table position is increased. At this time, it is counted up by the number of times of the operation of the drive. For example, if the writing request is issued once from the HOST, since the drive executes the process four times, the count value is eventually increased by +4. In place of counting the number of times of operation of the drive, a method of adding processing time of the drive upon reading/writing can be used. If the data is obtained here at the sampling period of every 10 seconds as shown in FIG. 5, balance characteristics of every elapsed time (10 seconds) of the I/O load can be obtained. By displaying those characteristics as a graph, the use frequency of each ECC group No. can be observed. In such an observation graph, for example, it is also possible to construct in a manner such that the graph is displayed on a display screen of the maintenance terminal 250 and the monitoring operator can manually execute the selecting process of the ECC group, which will be explained hereinlater.

A flow for the process to select the ECC groups to be concatenated will now be described. If the sampling period has expired in step 3000, step 3500 follows and an average value of the count values of the ECC groups collected in the monitor data table 160 is calculated. In next step 3600, one ECC group in which the average value is the maximum is selected. Subsequently, in step 3700, a combination of the ECC groups in which the average value is the minimum among the combinations of the selected ECC group and the residual ECC groups is selected by a program.

As for the number of ECC groups to be concatenated, the ECC groups of the number designated as the number of concatenations in the parameter table are concatenated. For example, if the number of concatenations has been set to 2, another ECC group which becomes a pair together with the ECC group in which the average value is the maximum and which has already been determined is decided. More simply, a combination of the ECC groups in which the average value is the minimum is selected from the average values obtained in step 3500. The numbers of the selected two ECC groups are stored into a concatenation instruction table 170 in FIG. 6. The ECC group numbers of the ECC groups as concatenation targets as many as the number of ECC groups to be concatenated are stored into the concatenation instruction table 170. If one set of ECC groups as concatenation targets is now determined, the ECC group numbers are stored into the first row. Also in the case where the number of concatenations is equal to 3 (when the number of concatenations is equal to 3, this means that there are three ECC groups to be concatenated) or more, all of the numbers of the ECC groups as concatenation targets are also similarly stored into the concatenation instruction table.

Subsequently, step 3800 follows and if the decided number of combinations of the ECC groups to be concatenated is smaller than the number of target ECC groups stored in the parameter table 150, the processing routine is returned to step 3500. The above processes are repeated. However, the ECC groups which have once been selected are excluded from the selection targets. When the decided number of combinations of the ECC groups to be concatenated reaches the number of target ECC groups, step 3900 follows. In step 3900, a process to concatenate the combination of the ECC groups set in the concatenation instruction table 170 is started. When the concatenating process is started once, it is executed independently of the reading/writing requests from the HOST until the completion of the concatenation. After the concatenating process is started, since the processing steps after step 3000 are unnecessary, those processes are skipped.

Figure 9A:
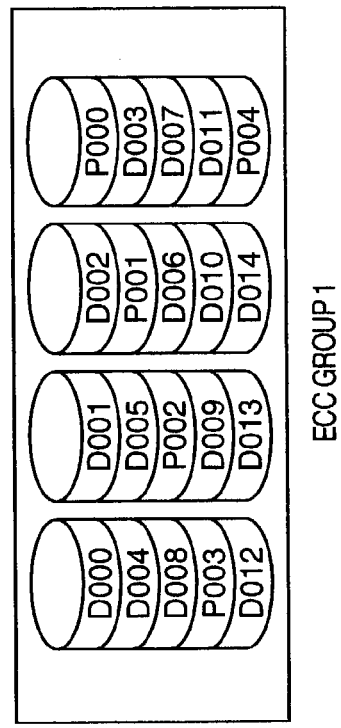
FIGS. 9A and 9B are diagrams showing allocation of data to the ECC groups before and after they are concatenated.
Figure 9B:
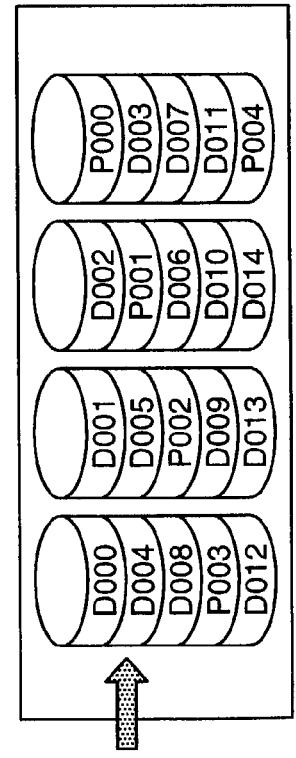
Figure 9B:
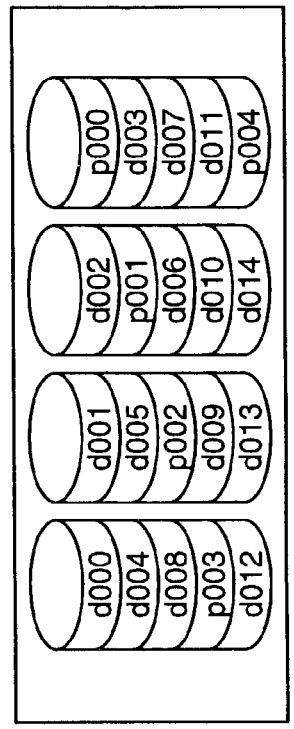

Subsequently, processes at the time of concatenating the ECC groups will be explained with reference to FIGS. 9A and 9B. First, FIG. 9A shows first states of an ECC group 1 and an ECC group 2. User data D000 to D014 and parities P000 to P004 have been stored in the ECC group 1 among four drives. Similarly, user data d000 to d014 and parities p000 to p004 have been stored in the ECC group 2.

Now, assuming that the ECC group 1 and the ECC group 2 are selected as targets of concatenation, a method of swapping the even-number rows of the ECC group 1 and the ECC group 2 is used as a concatenating method. To show the numbers of the rows in which the swapping has been performed, a reallocation pointer is provided and managed. First, since the reallocation pointer is equal to 1 and the first row is out of the targets of swapping, it is skipped.

Subsequently, "1" is added to the reallocation pointer and the pointer is shifted to the second row. Since the second row is the even-number row, it is set to the swapping target. The swapping is executed as follows. First, all values of the second rows of the ECC group 1 and the ECC group 2 are read out from the cache memory 110, the values of the second row of the ECC group 1 are written into the second row of the ECC group 2, and the values of the second row of the ECC group 2 are written into the second row of the ECC group 1 (refer to FIG. 9B). In a manner similar to the above, by setting only the even-number rows to the swapping targets and repeating the swapping operation with respect to all rows, the concatenation is completed. By swapping the user data (that is, the logical volumes) of the ECC group 1 and the ECC group 2, that is, reallocating them and concatenating the ECC groups as mentioned above, the use frequency of the I/O is averaged as a whole.

When the reading/writing requests are issued from the HOST to the concatenated ECC groups, since the reallocation is not performed yet to the data under the reallocation pointer, the drive of the target of the reading/writing operations is determined on the basis of the mapping logic before the reallocation. In the case of the data over the reallocation pointer, if they are located on the odd-number rows, since they are not swapped, the drive of the target of the reading/writing operations is determined on the basis of the mapping logic before the reallocation. In the case of the data on the even-number rows, since the ECC group 1 and the ECC group 2 have been reversed, the drive of the ECC group on the opposite side is set to the target of the reading/writing operations, respectively. If the access target by the HOST is located in the same position as that of the reallocation pointer, since the values of the ECC group 1 and the ECC group 2 are not specified yet, the system waits until the reallocation pointer progresses by "1". While the reading/writing requests from the HOST are processed as mentioned above, that is, while the process from the upper processing apparatus is continued, the reallocating process can be continued.

According to the second embodiment of the invention, the ECC groups which have been concatenated in the first embodiment are deconcatenated to the ECC groups in the states before the concatenation in the following manner. Monitor data of each ECC group is obtained in a manner similar to that in the first embodiment. After the expiration of the sampling period, an average value of the monitor data is obtained. Among the concatenated ECC groups, if the average value is larger than a preset threshold value, it is regarded that an effect of the concatenation is low, the concatenated state is cancelled, thereby returning it to the states of the ECC groups before the concatenation.

In this process, the data of the even-number rows of each ECC group is read out from the cache memory and written in the same position of the opposite ECC group in a manner similar to that in the first embodiment. In a manner similar to that in the first embodiment, the rows on which the data is being swapped are shown by the pointer and the mapping method before the pointer is changed to a different mapping method after the pointer, so that the deconcatenation which means to release the concatenation can be executed while the reading/writing operations from the HOST are continued. It is also possible to obtain the maximum value in the monitor data in place of obtaining the average value of the monitor data and determine that the ECC groups are the deconcatenation targets in the case where the maximum value is equal to or larger than the threshold value. Also in the case of the average value or the case of the maximum value, the threshold value can be inputted from the maintenance terminal 250 by the operator or the program in place of the preset threshold value.

Further, according to the third embodiment of the invention, one of the ECC groups concatenated in the first embodiment is changed to another ECC group in the following manner. The monitor data of each ECC group is obtained in a manner similar to the first embodiment. After expiration of the sampling period (for example, 24 hours), the average value of the monitor data is obtained. A combination in which the average value of the monitor data decreases is further searched from combinations of another non-concatenated ECC group and the concatenated ECC groups.

Further, if the combination in which the average value of the monitor data decreases can be detected, swapping of the pair is executed in the following manner. For example, in the case of removing the ECC group 2 from the state where the ECC group 1 and the ECC group 2 have been concatenated and concatenating the ECC group 1 and the ECC group 3, the data and the parities on the second rows of the ECC groups 1, 2, and 3 are read into the cache memory. Then, from the cache memory the data and the parities of the ECC group 1 are written in the same positions as those of the ECC group 2, the data and the parities of the ECC group 2 are written in the same positions as those of the ECC group 3, and the data and the parities of the ECC group 3 are written in the same positions as those of the ECC group 1, respectively. By executing the above processes with respect to all of the even-number rows, a state where the ECC group 1 and the ECC group 3 are concatenated and the ECC group 2 is not concatenated is obtained. Also in this swapping case, in a manner similar to the case of the first embodiment, the row which is swapped is shown by the reallocation pointer, the mapping methods are changed with respect to the data before and after the pointer, and the swapping can be performed while executing the reading/writing processes from the HOST.

Further, according to the fourth embodiment of the invention, after the monitor data is obtained in the first embodiment, the values of the monitor data table are displayed on the monitor display screen of the maintenance terminal 250, the user confirms the values, and instruction data showing which ECC groups are concatenated is inputted from the maintenance terminal 250. The inputted data is stored into the concatenation instruction table 170 and the concatenation is executed in a manner similar to the first embodiment. As an embodiment, for example, the user of the maintenance terminal 250 observes the displayed graph with the elapse of the time of the use frequency as shown in FIG. 5 and can manually concatenate the ECC group whose use frequency is the minimum in a specific time zone and the ECC group whose use frequency is the maximum. Such a manual operation can be executed by inputting an instruction to the program.

According to the invention, in the case of monitoring the use frequency (I/O load) of the ECC groups and concatenating the ECC groups, the combination in which the maximum effect can be obtained with respect to the performance can be determined. Therefore, the load balancing capability to a plurality of disk drive groups can be dynamically increased to the user data of different time-sequential changes due to various kinds of work.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disk array system comprising:
a plurality of magnetic disk drive groups each including a plurality of magnetic disk drives; and
a disk controller for controlling data transfer between said plurality of magnetic disk drive groups and an upper apparatus,
wherein said disk controller obtains a use frequency with respect to each of said plurality of magnetic disk drive groups and selects a combination of the magnetic disk drive groups based on said obtained use frequency, and wherein logical volumes from said upper apparatus allocated in each of the magnetic disk drive groups before selection of said combination of the magnetic disk drive groups are reallocated among said combination of the magnetic disk drive groups, thereby concatenating said combination of the magnetic disk drive groups.

2. A system according to claim 1, wherein said use frequency is obtained with respect to the magnetic disk drive groups after said magnetic disk drive groups have been concatenated and, when said obtained use frequency is larger than a set value, the magnetic disk drive groups are deconcatenated to a state before said concatenation.

3. A system according to claim 1, wherein said use frequency is obtained with respect to the magnetic disk drive groups after said magnetic disk drive groups were concatenated and, based on said obtained use frequency, one of the concatenated magnetic disk drive groups is swapped to another non-concatenated magnetic disk drive group.

4. A system according to claim 1, wherein the reallocation of said logical volumes is executed while continuing a process from said upper apparatus.

5. A system according to claim 1, wherein said combination of the magnetic disk drive groups is automatically selected based on said obtained use frequency in accordance with a program.

6. A system according to claim 1, wherein said combination of the magnetic disk drive groups is manually selected based on display data of a user monitor display screen of said use frequency.

7. A disk control apparatus for controlling data transfer between a plurality of magnetic disk drive groups and an upper apparatus, wherein a use frequency is obtained with respect to each of said plurality of magnetic disk drive groups and a combination of the magnetic disk drive groups is selected based on said obtained use frequency, and logical volumes allocated in each of the magnetic disk drive groups before selection of said combination of the magnetic disk drive groups are reallocated among said combination of the magnetic disk drive groups, thereby concatenating said combination of the magnetic disk drive groups.

8. An apparatus according to claim 7, wherein said use frequency is obtained with respect to the magnetic disk drive groups after said magnetic disk drive groups have been concatenated and, when said obtained use frequency is larger than a set value, the magnetic disk drive groups are deconcatenated to a state before said concatenation.

9. An apparatus according to claim 7, wherein said use frequency is obtained with respect to the magnetic disk drive groups after said magnetic disk drive groups have been concatenated and, based on said obtained use frequency, one of the concatenated magnetic disk drive groups is swapped to another non-concatenated magnetic disk drive group.

10. A disk control apparatus in a disk array system including a plurality of magnetic disk drive groups each including a plurality of magnetic disk drives and an upper apparatus and controls data transfer between said plurality of magnetic disk drive groups and said upper apparatus, comprising:

use frequency monitor means for monitoring a use frequency of an Error Correction Code (ECC) set unit with respect to each of said plurality of magnetic disk drive groups;

selecting means for calculating a load degree of each group of combinations of the magnetic disk drive groups based on said monitor use frequency and selecting a combination of relevant ones of said magnetic disk drive groups that provides a minimum average value of said calculated load degrees; and drive group concatenating means for reallocating logical volumes from said upper apparatus and allocated in each of the magnetic disk drive groups before selection of said combination of relevant ones of said magnetic disk drive groups in accordance with a result of the selection by said selecting means, thereby concatenating said combination of relevant ones of said magnetic disk drive groups.

11. An apparatus according to claim 10, further comprising:

deconcatenating means for deconcatenating the logical concatenation of said magnetic drive groups in accordance with a result of monitoring by said frequency monitor means of said use frequency of a predetermined period of said concatenated magnetic disk drive groups.

12. An apparatus according to claim 11, further comprising:

means for swapping one magnetic disk drive group of high use frequency among said concatenated magnetic disk drive groups to another non-concatenated magnetic disk drive group in response to an output of said deconcatenating means.

* * * * *